INVENTORS
JAKOB H. HOHL
KARL H. RAACKE

BY *Willis E. Higgins*

ATTORNEY

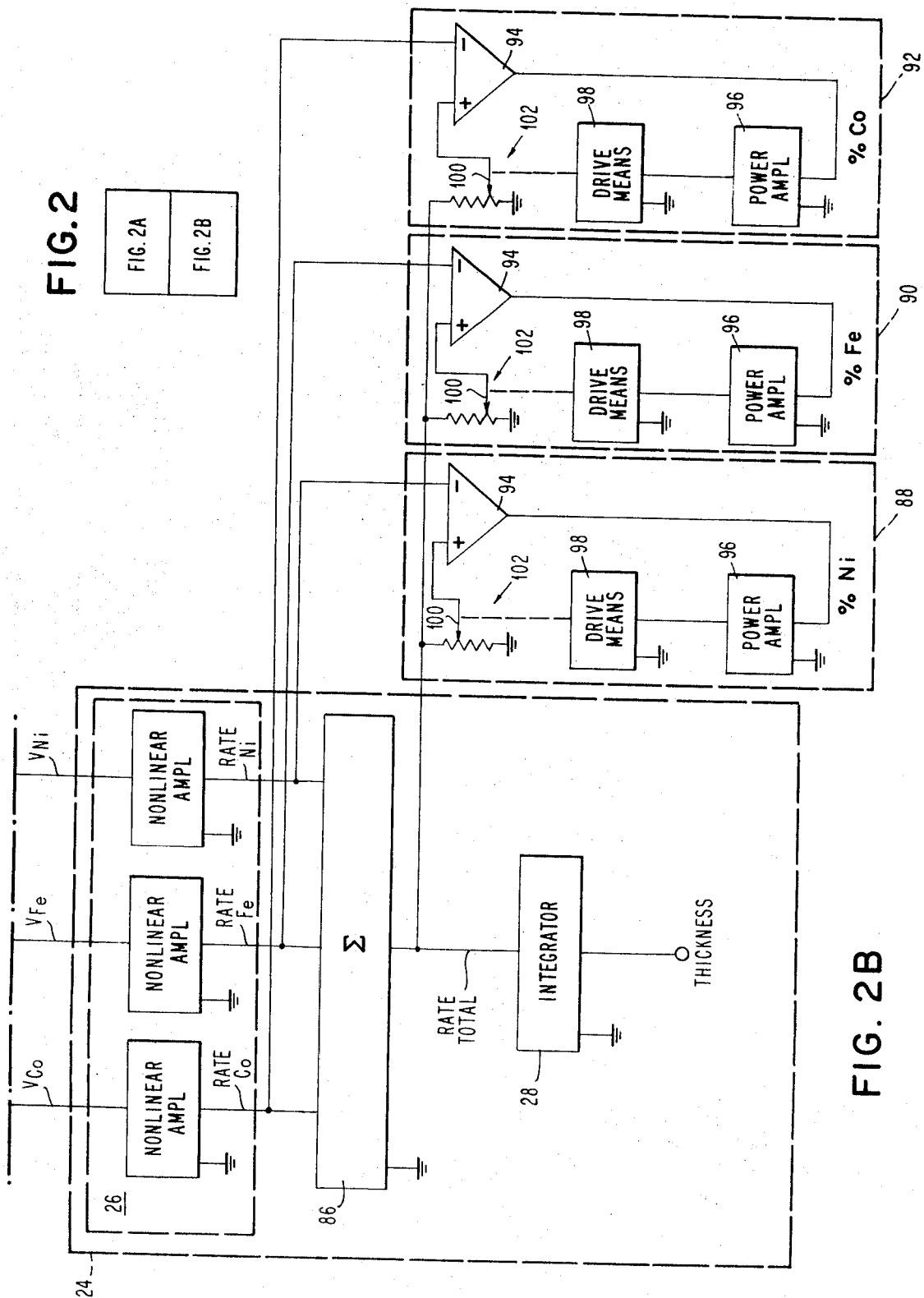

April 4, 1972
J. H. HOHL ET AL
3,654,109

APPARATUS AND METHOD FOR MEASURING RATE IN FLOW PROCESSES

Filed April 25, 1968

United States Patent Office 3,654,109
Patented Apr. 4, 1972

3,654,109
APPARATUS AND METHOD FOR MEASURING RATE IN FLOW PROCESSES
Jakob H. Hohl and Karl H. Raacke, Essex Junction, Vt., assignors to International Business Machines Corporation, Armonk, N.Y.
Filed Apr. 25, 1968, Ser. No. 724,179
Int. Cl. C23c 15/00
U.S. Cl. 204—192                     26 Claims

ABSTRACT OF THE DISCLOSURE

Rate, thickness, and composition of materials deposited in vapor deposition processes may be measured, even at very low deposition rates, using the disclosed atomic absorption spectroscopy apparatus. The apparatus has a source of radiant energy having a selected wavelength absorbed by the material sought to be measured and means for measuring the total amount of radiant energy so absorbed at the selected wavelength. It further includes means for converting this absorption measurement to a rate and/or thickness measurement and also a composition measurement, if desired. Radiant energy in the ultraviolet light spectrum is normally employed, and the disclosed apparatus and method is particularly suited for measuring deposition parameters in the fabrication of nickel-iron magnetic films.

FIELD OF THE INVENTION

This invention relates to an apparatus and method for measuring deposition parameters in vapor deposition processes. More particularly, it relates to an apparatus and method for measuring rate, thickness, or composition, each alone or simultaneously, in processes involving the deposition of material on substrates by vapor deposition techniques. The present apparatus and process relies on the use of atomic absorption spectroscopy.

As used herein, the term "vapor deposition" refers to those processes wherein a material is condensed from the vapor or gaseous phase onto a substrate which it is desired to coat with the material. The material to be coated on the substrate may enter the vapor or gaseous phase by essentially any method, such as evaporation, sputtering, or the like.

DESCRIPTION OF THE PRIOR ART

Atomic absorption spectroscopy has found wide application as an analytical technique. Typically, a sample to be measured thereby is converted into an atomic vapor in a flame, and the measurement of the amount of light absorbed at certain wavelengths by the atomic vapor will give an indication of the sample content. Some work has been done with flameless atomic absorption spectroscopy. For example, U.S. Pat. 3,102,257 discloses a flameless atomic absorption apparatus used to indicate the presence of dangerous gases. An indication of the state of the art in atomic absorption spectroscopy may be obtained from the article, An Atomic Absorption Spectrophotometer, by Kahn and Slavin, Applied Optics, volume 2, No. 9, p. 931 (September 1963).

There are a variety of techniques disclosed in the art for monitoring deposition parameters. The known techniques may be divided into two broad categories: techniques which depend on a change in physical characteristics of a probe positioned in a vapor stream to be measured, and those which are based on purely optical techniques.

Illustrative of the techniques relying on physical changes in a probe positioned in the vapor stream is the well-known crystal monitor, which relies on a shift of resonant frequency in a quartz crystal due to material deposited on it. This technique has found wide application in vapor deposition processes, particularly where relatively low deposition rates are employed. However, the technique requires replacement of the crystal during prolonged deposition, and the technique does not have the capacity to discriminate between different materials.

Another measuring device relying on physical changes in a probe positioned in the vapor stream is disclosed in U.S. Pat. 3,313,914 to Roberts et al., assigned to IBM. The device there disclosed comprises a pair of closely spaced electrodes having a temperature difference between them wherein the net thermionic electron flow from one to the other depends on the amount of vapor flowing between them. Since this probe does not require deposition of the material sought to be measured on it, it is more reliable than the crystal monitor for prolonged deposition processes. However, even this technique is subject to eventual contamination from the vapor stream being measured. A further disadvantage shared by this and all measuring techniques depending on changes induced in a probe positioned in the vapor stream is that they cannot be positioned near the substrate on which deposition is taking place, since they all must interfere with the vapor stream to some extent to achieve the desired measurement. The necessity to position such measuring devices remote from the substrate introduces an inherent limitation in the accuracy of such devices for measuring what is actually deposited on the substrate.

Another technique for measuring vapor deposition is disclosed in U.S. Pat. 3,373,278. The technique there disclosed depends on exciting the vapor being deposited to the ionized state, then measuring the total amount of X-rays emitted from the vapor. This technique requires the use of large amounts of energy to ionize the vapor in order to produce the X-ray emission. Relatively small amounts of vapor cannot produce enough emission for reliable measurement. Also, at low deposition rates, background emission produces spurious readings. This technique is therefor suitable only for high deposition rates, usually at least 100 times higher than those normally employed for the deposition of magnetic films.

An example of an optical device for measuring the thickness of a film after it has been deposited on a substrate is disclosed in the IBM Technical Disclosure Bulletin, volume 8, No. 11, p. 1584 (April 1966). The device there disclosed measures thickness by sensing the attenuation of a laser beam passing through the material sought to be measured. Such a technique can be used only after the deposition has taken place, and it is necessary that the material being measured be at least partially transparent to the beam being used. Its use for measuring deposition of metals is therefore limited.

Measuring nickel-iron magnetic film vapor deposition rates, thicknesses, and compositions is one of the most demanding situations for vapor deposition measuring apparatus. Relatively low deposition rates are employed. The nickel-iron alloy source composition tends to change with time, because the constituents have different vapor pressures. For these two reasons, a high degree of sensitivity and quick response are required in the measuring apparatus. Since the deposition of magnetic films takes place in the presence of a strong magnetic field, the measuring apparatus must also be unaffected by magnetic fields.

SUMMARY OF THE INVENTION

It is therefore an object of this invention to provide a reliable measuring apparatus for vapor deposition processes that may be used with either low or high deposition rates.

It is a further object of this invention to provide an apparatus for measuring vapor deposition parameters sensitive enough for use where relatively low deposition rates are employed and wherein the necessary measurements are obtained without interfering physically with the vapor stream.

It is still another object of the invention to provide a means relying on radiant energy for measuring deposition parameters in a vapor deposition process while deposition is taking place.

It is yet another object of this invention to provide an apparatus relying on radiant energy sensitive enough for measuring the thickness of material vapor deposited on a substrate even at relatively low deposition rates.

It is a further object of the invention to provide a measuring apparatus for use in vapor deposition processes sensitive enough for measuring the thickness of material vapor deposited on a substrate which does not depend on a change induced by the vapor stream in the apparatus itself.

It is another object of the invention to provide a means for measuring evaporation rates of individual elements being evaporated simultaneously in a vapor stream.

It is a special object of the invention to provide an apparatus for measuring thickness of material deposited in a vapor deposition process on a continuous basis and also simultaneously measure the composition of the material being deposited, where that composition is likely to change with time.

It is another special object of the invention to provide reliable vapor deposition data that may be used for continuous process control while depositing.

It is another special object of the invention to provide an apparatus relying on radiant energy for measuring deposition rates, thicknesses, and compositions in the vapor deposition of magnetic films.

Finally, it is a special object of the invention to provide an apparatus sensitive enough to measure both deposition rates or thicknesses and vapor stream compositions, which apparatus is unaffected by magnetic fields.

These and other related objects may be attained through use of the measuring apparatus herein disclosed. The apparatus has a source of radiant energy having a selected wavelength which is absorbed by the material sought to be measured. The radiant energy, which is usually in the ultraviolet, visible, or infrared range of the spectrum, is directed into the vapor stream of the material being deposited. The radiant energy so directed is absorbed by the material sought to be measured in one or more of its wavelengths. Through the vapor stream and opposite to the source of radiant energy is a means for measuring the total amount of radiant energy so absorbed at the selected wavelength. Since the total amount of radiant energy absorbed at the selected wavelength is a function of the total amount of material sought to be measured between the source of radiant energy and the means for measuring the amount of absorption, the absorption measurement may be converted to a measurement of the rate the material sought to be measured passes the measuring point, and hence to a thickness measurement, by use of a suitable converting means.

Where more than one element is contained in the material sought to be measured, the use of more than one selected wavelength, each wavelength being selected for a particular element and not being absorbed by the other elements present, gives an apparatus and process suitable for measuring the composition and thickness of an alloy being deposited on a substrate simultaneously. While the disclosed apparatus and process may be used for measuring essentially any material being deposited, it is therefore particularly useful for measuring the rate, thickness, and composition of nickel-iron alloy magnetic films being deposited on a substrate in a vapor deposition process. Such magnetic films are usually deposited at rates of from 5 angstroms per second to about 50 angstroms per second. The apparatus and method of this invention has been proved experimentally to be sensitive enough for measuring deposition rates and compositions at these levels.

The foregoing and other objects, features, and advantages of the invention will be apparent from the following more particular description of the preferred embodiments of the invention, as illustrated in the accompanying drawings.

BRIEF DESCRIPTION OF THE DRAWINGS

In the drawings:

FIG. 2 shows the relationship between FIGS. 2A and 2B.

FIG. 2B is a detailed diagram of the portion of the claimed apparatus which converts the measurement of light absorbed to a composition, rate, and thickness measurement.

DESCRIPTION OF THE PREFERRED EMBODIMENTS

In the following description, the invention will be described as an apparatus and method for measuring rate, thickness, or composition, either individually or simultaneously, in the vapor deposition of nickel-iron magnetic films. The apparatus and method may be used for measuring deposition parameters in a wide variety of other vapor deposition processes. However, the performance characteristics and limitations for such measuring apparatus are among the most demanding in the deposition of magnetic films of all vapor deposition processes.

Figure 1:
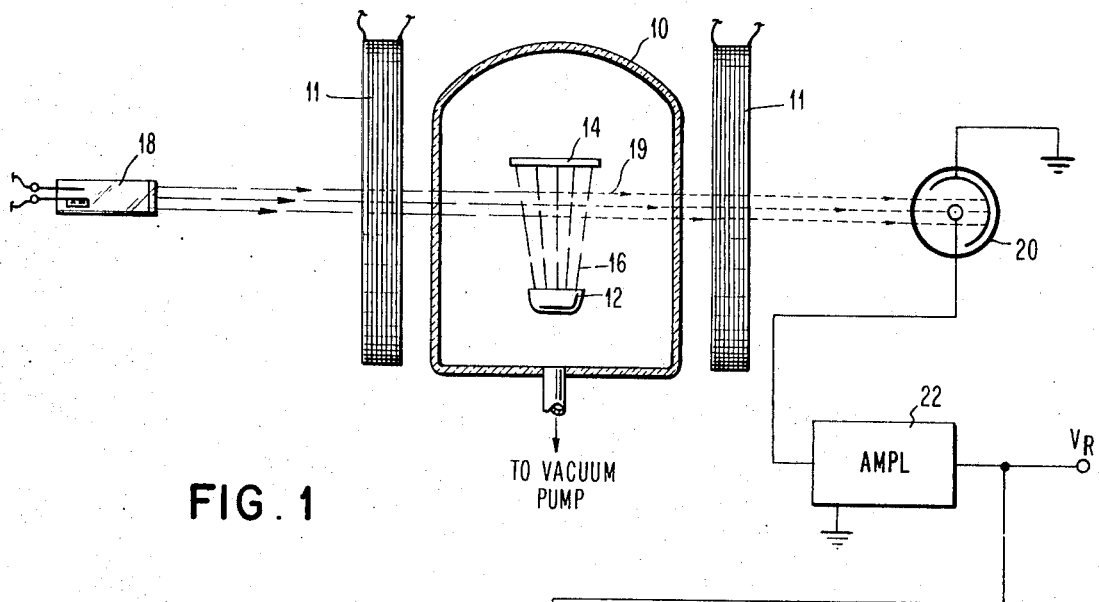
FIG. 1 is a diagram of the claimed apparatus in schematic form.

Referring now to the drawings, more particularly to FIG. 1, there is shown an example of the claimed apparatus in schematic form. As shown, positioned on one side of deposition chamber 10 with Helmholtz coils 11 positioned to provide the required magnetic field for creation of a prefered axis in the magnetic film during deposition and containing nickel-iron alloy source 12 and substrate 14 on which nickel-iron vapor 16 is condensed to produce a magnetic film 17, there is provided a source 18 of radiant energy 19 directed at the vapor 16.

On the other side of deposition chamber 10 from the radiant energy source 18 is a photocell, photomultiplier, or other suitable detector 20, positioned to receive the remaining radiant energy 19 that is not absorbed by the vapor 16. The measurement of radiant energy so absorbed that is obtained by the detector 20, after being amplified by the amplifier 22, to give an output voltage $V_R$ which is a function of the rate, is fed to the means 24 for converting the measurement of radiant energy absorbed to a thickness measurement.

In practicing the method of this invention, the output voltage $V_R$ may be converted to a measurement of rate or thickness through the use of a suitable calibration. However, it is preferred to carry this operation out automatically with suitable circuitry 24 therefor.

The output voltage $V_R$ is a non-linear function of the deposition rate of the vapor 16. A non-linear amplifier 26 is therefore provided for converting the output voltage $V_R$ to a linear rate measurement. An integrator 28 si provided to give the desired thickness measurement.

Figure 2A:
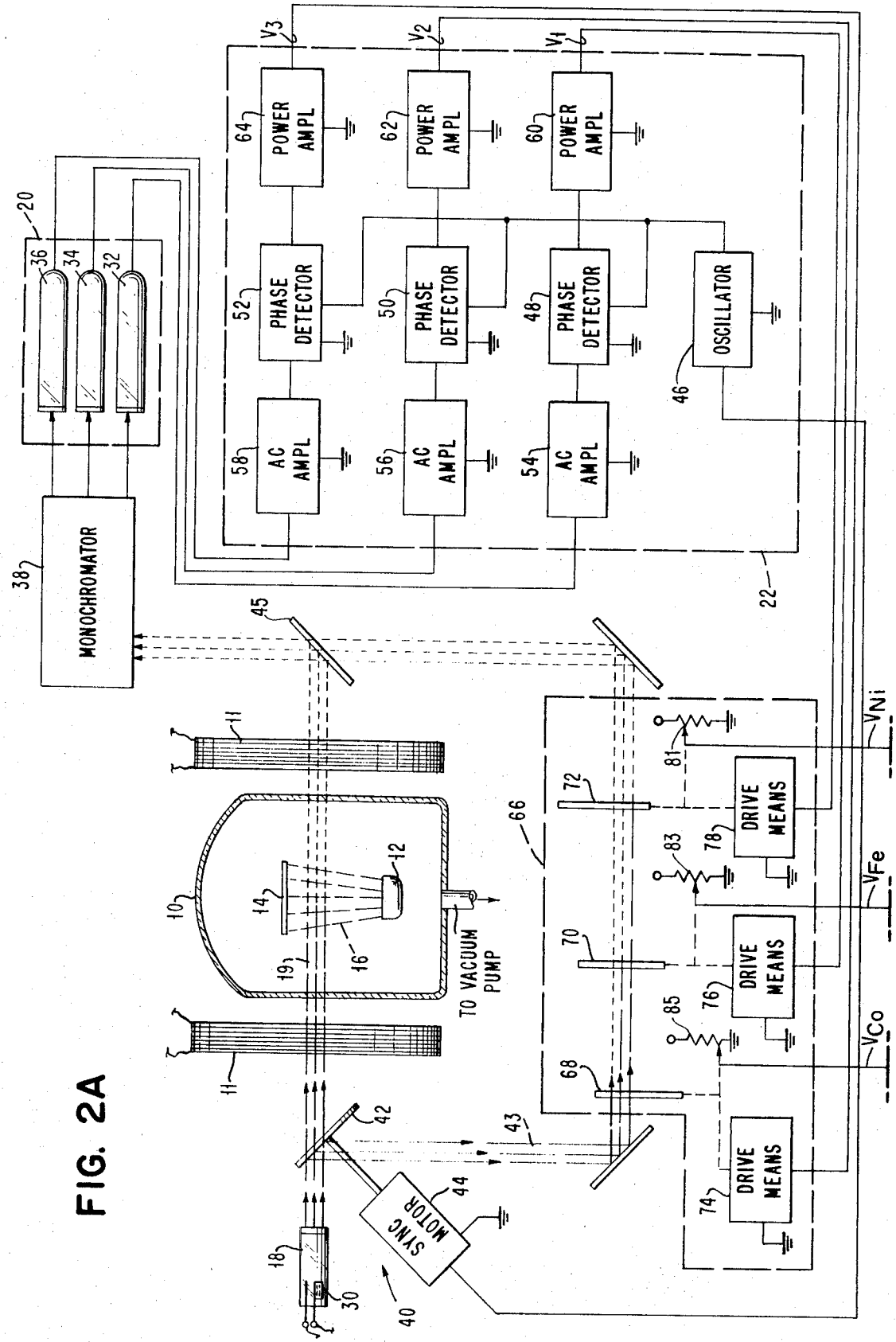
FIG. 2A is a detailed diagram of the portion of the claimed apparatus which obtains a measurement of the light absorbed.

FIGS. 2A and 2B show a preferred form of the apparatus. Referring now to those figures, the elements of the claimed apparatus will now be described in more detail.

The radiant energy source.—For best results, the source 18 (shown in FIG. 2A) is a hollow cathode lamp having a cathode 30 containing the elements sought to be measured, in this case nickel, iron, and any other elements in the alloy being deposited which need to be measured, such as cobalt. Ion bombardment or sputtering of this cathode produces light characteristic of the emission spectral lines of nickel, iron, and cobalt. The nickel, iron, and cobalt in the vapor 16 all have strong absorption bands in the ultraviolet wavelength range of from about 2,000 to about 3,000 angstroms, which correspond to the emission lines from the lamp. Wavelengths in these absorption bands are suitable for the deposition rates normally employed for fabricating magnetic films, i.e. from about 5 to about 50 angstroms per second. For higher deposition rates, other wavelengths in weaker absorption bands for nickel, iron, or cobalt (e.g., about 3,000 to about 4,000 angstroms) would be employed to give better measurements. All of these wavelengths are emitted by the hollow cathode lamp.

The detector.—As shown in FIG. 2A, the detector 20 is preferably a photomultiplier 32, 34, or 36 for each element to be measured. Any other suitable photoelectric transducer of adequate sensitivity, such as a photocell, gas filled photocell, or photodiode, may be used in place of each photomultiplier. A monochromator 38 is provided to separate spatially the wavelength of light being absorbed by each element being measured and to direct such wavelength to its corresponding photomultiplier.

The amplifier.—The amplifier 22, shown in FIG. 2A as a lock-in amplifier, in combination with the chopper 40 as shown gives the best results in the subject apparatus and reduces calibration problems substantially. The chopper 40 has a rotating slotted mirror 42 driven by synchronous motor 44. The rotating mirror 42 serves to direct the light from source 18 alternatively in pulses through the deposition chamber and vapor therein, and on the path shown around the deposition chamber 10 to give a reference beam 43 for comparison with the beam 19 directed through the deposition chamber. The pulses of light in the beam 43 around the deposition chamber are in phase with a sine wave emitted by oscillator 46 to drive the synchronous motor 44. Reference beam 43 and sample beam 19 are recombined in the same path by a semitransparent mirror 45 before entering the monochromator 38.

The synchronous motor is driven by the signal from the master oscillator 46 which also supplies a signal for each of three phase detectors 48, 50, and 52. The output signals from photomultipliers 32, 34, and 36 induced by the reference beam 43 and the sample beam 19 are amplified by A.C. amplifiers 54, 56, and 58. The phase detectors multiply the output signals induced by reference beam 43 and sample beam 19 with the signals supplied by the oscillator 46, then filter out a D.C. component thus generated, which is proportional to the difference between these signals. The output fed to power amplifiers 60, 62, and 64 is thus based on the difference in intensity between the sample beam 19 and the reference beam 43. Alternatively, a signal pulse taken directly from the synchronous motor 44 can be fed to the phase detectors. In this case, the oscillator 46 is omitted. The power amplifiers 60, 62, and 64 increase the signals sufficiently to give signals $V_1$, $V_2$, and $V_3$, used to drive an attenuator 66.

The attenuator.—For the purpose of attenuating the reference beam provided by chopper 40 to make it equal in intensity to the sample beam, the attenuator 66 in FIG. 2A has wavelength filters 68, 70, and 72 operatively connected to corresponding drive means 74, 76, and 78. Each wavelength filter is chosen to filter out only the particular wavelength chosen for each element to be measured.

Figure 3:
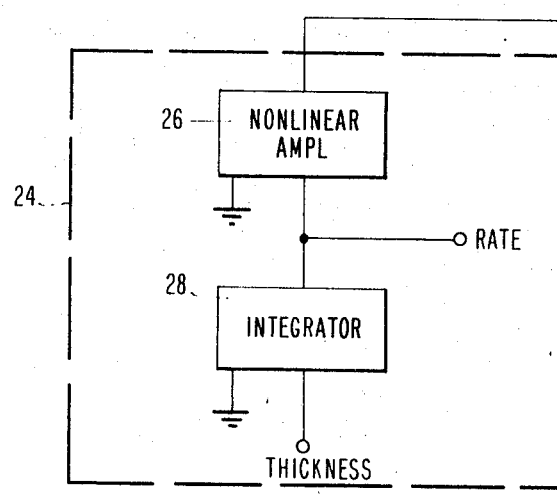
FIG. 3 shows details of three wavelength filters used in the apparatus illustrated in FIG. 2A.
Figure 3:
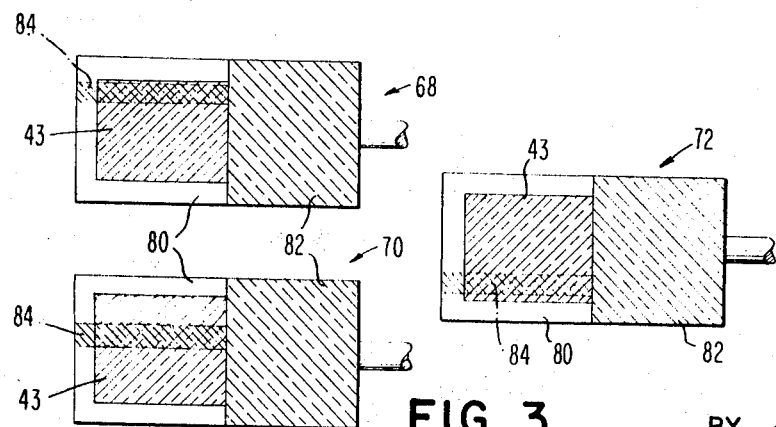

FIG. 3 is a representation of the three wavelength filters 68, 70, and 72. Each filter has a substrate 80 transparent to the wavelengths being measured, such as a silica plate, having a first filter area 82 and a second filter area 84. The plate is positioned within the reference beam 43 shown in cross section so that the first filter area can be moved into the path of the reference beam and the amount of the reference beam subject to the second filter area 84 can be gradually reduced. The first filter area 82 filters out only the wavelength chosen for one of the elements to be measured, and passes most of the remaining beam 43. However, such filters also decrease the intensity of the other wavelengths somewhat. Second filter area 84 is provided to compensate for this unwanted filtering of wavelengths other than the one chosen for the element being measured. Filter area 84 filters out other wavelengths in beam 43 but passes the wavelength chosen for the element being measured. It is moved out of the path of beam 43 a sufficient amount to compensate for attenuation of beam 43 due to unwanted absorption by filter area 82.

As shown, the second filter area 84 of each wavelength filter is arranged so that it does not intercept the same portion of the reference beam 43 as the other two second filter areas. This is necessary so that the compensation for attenuation by the filter areas 82 is independent for each wavelength filter 68, 70, or 72.

Use of such an attenuator eliminates drift caused either by the amplification circuitry or the output intensity of the light source 18, since it is a nulling system which adjusts the reference beam and the sample beam to equal intensity.

The information for establishing the deposition rate for each element being measured is determined from the position of each filter 68, 70, and 72. As shown, potentiometers 81, 83, and 85 provide output signals. $V_{Ni}$, $V_{Fe}$, and $V_{Co}$, which are a function of the position of filters 72, 70, and 68 respectively. The system is adjusted so that the signals $V_{Ni}$, $V_{Fe}$, and $V_{Co}$, are zero when there is no absorption of the sample beam 19 by vapor 16. This is usually done by making the signals induced by the reference beam 43 and the sample beam 19 equal when no absorption by vapor 16 is taking place.

Other means for attenuating the reference beam 43 at the selected wavelengths in response to an electrical signal may be employed. For example, a Kerr cell can be arranged to decrease the intensity proportionally to signals fed to it.

Circuitry for converting the absorption measurements to a rate and thickness measurement.—As shown in FIG. 2B, the output signals $V_{Ni}$, $V_{Fe}$, and $V_{Co}$ are amplified in the non-linear amplifiers 26 in converting circuitry 24 to give voltages proportional to the rates of nickel, iron, and cobalt, respectively, passing between the light source and detector. These voltages are added together by summing circuit 86 to give a total rate measurement. The integrator 28 converts this rate measurement to a measurement of the thickness of material deposited on the substrate 14.

Means for converting the measurement of light absorbed to a composition measurement.—The measurement of composition in the vapor stream 16 is obtained through use of means 88, 90, and 92 in FIG. 2B for comparing the rate signal obtained from the nickel, iron, and cobalt absorption measurements respectively. Each such means has a differential amplifier 94 for obtaining the difference between the rate signal for each element to be measured and the total rate signal. The output from the differential amplifier 94 is amplified by power amplifier 96 and used to power the drive means 98 which drives the contact 100 of potentiometer 102 to a portion of its maximum output. Since the maximum output of potentiometer 102 is the signal corresponding to the total rate of material passing between light source 18 and detector 20, potentiometer 102 may be calibrated to express the percentage composition of each element being measured in the vapor stream 16.

Figure 4:
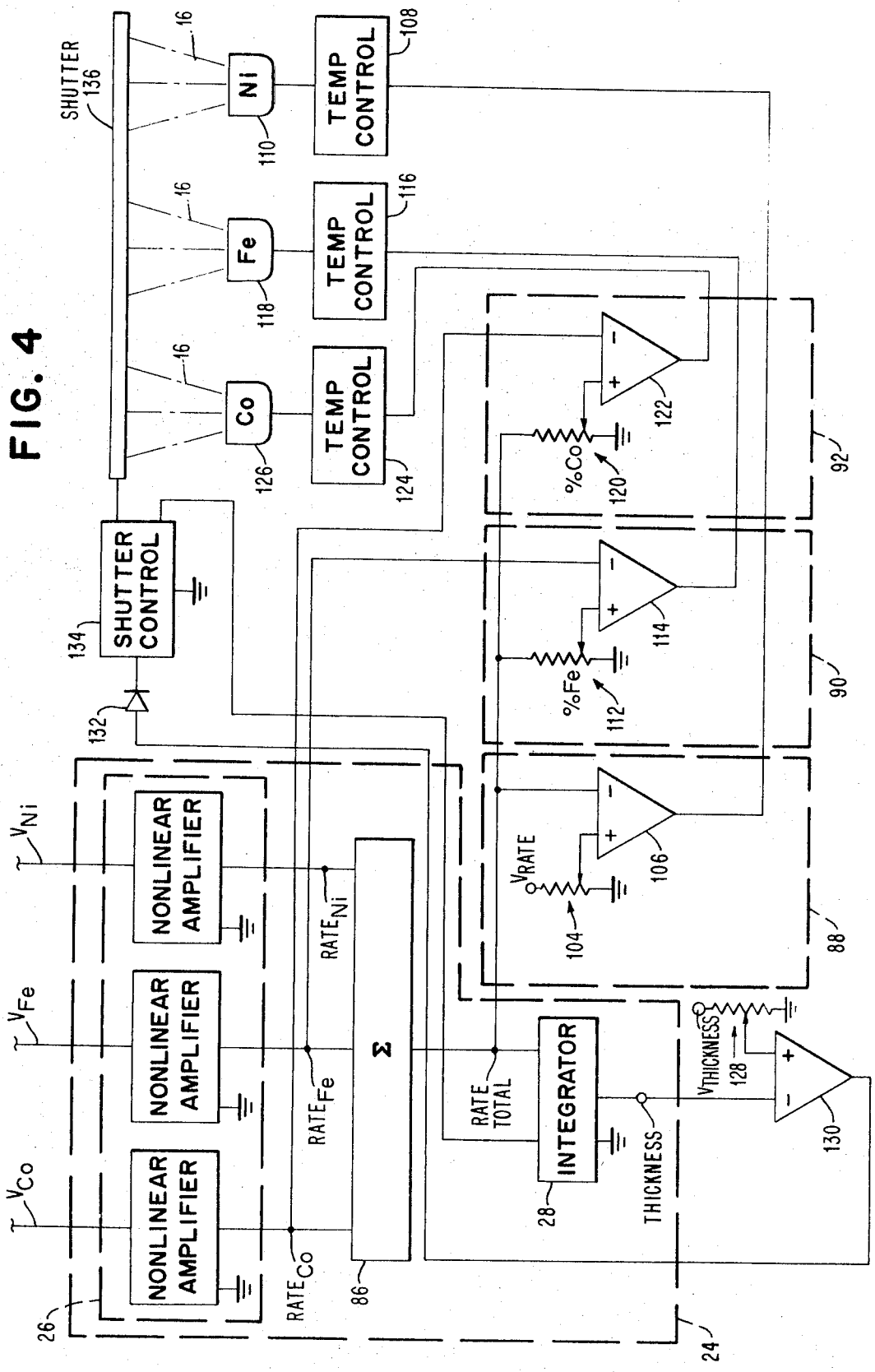
FIG. 4 is a modification of the portion of the apparatus shown in FIG. 2B, for the purpose of allowing automatic feedback control of vapor deposition processes.

The means 24 for converting the measurement of light absorbed to a thickness measurement and the means 88, 90, and 92 for determining the composition of the vapor stream 16 shown in FIGS. 1 and 2B may be modified as shown in FIG. 4 to give automatic feedback control for controlling the rate and composition of the vapor stream 16 and also for intercepting the flow of vapor to the substrate 14 when a predetermined thickness of material has been deposited thereon. As shown, the rate of deposition of the vapor is controlled by changing the evaporation rate of nickel, the most abundant component in the vapor stream, based on an output signal obtained by comparing the signal representing the actual total rate passing the measuring point in chamber 10 with a voltage corresponding to the rate desired as obtained by setting potentiometer 104. Differential amplifier 106 makes this comparison and feeds a signal based on the difference to a temperature control 108 for the nickel source 110. By raising and lowering the temperature of the nickel deposition source, the rate of deposition of the nickel is raised or lowered. When the desired deposition rate is obtained, the signal corresponding to the actual total rate of deposition and the signal obtained from potentiometer 104 will be equal, and temperature control 108 will maintain the temperature of source 110 at the established level. For quick response an electron beam gun evaporation source is preferred.

Similarly, potentiometer 112 is set to an output voltage which is a fraction of the total rate signal and corresponds to the percent iron desired in the vapor stream 16. The signal from potentiometer 112 is compared with the output signal corresponding to the actual deposition rate of iron from the vapor 16 by differential amplifier 114. The output from differential amplifier 114 is used to activate temperature control 116 for raising or lowering the temperature of iron source 118. When the output signal from potentiometer 112 equals the output signal corresponding to the actual rate of deposition of iron from the vapor stream 16, temperature control 116 will maintain the iron source 118 at the established temperature.

A similar comparison of an output signal from potentiometer 120, set to the desired percentage of cobalt in the vapor stream 16, is made with the output signal corresponding to the actual rate of deposition of cobalt from the vapor 16. The resulting difference signal is used to drive temperature control 124 and thereby change the temperature of cobalt source 126.

To provide automatic control when the desired thickness of deposition on substrate 14 has been attained, a signal corresponding to the desired thickness as set in potentiometer 128 is compared in differential amplifier 130 with the signal corresponding to the actual thickness of material on substrate 14 as obtained from integrator 28. As long as the signal corresponding to the actual thickness is less than the signal corresponding to the desired thickness, diode 132 will pass current to shutter control 134 for keeping shutter 136 in its open position. When the two thickness signals are equal, current no longer flows through diode 132, and shutter control 134 is activated to close shutter 136.

If more than one substrate is to be coated in a pump down of deposition chamber 10, the mechanism for bringing a new substrate into the deposition position can be arranged to reset the integrator 28 for the new deposition. For this purpose, shutter control 134 should be connected to integrator 28 to start and stop the integration when shutter 136 is opened to begin deposition and when it is closed to end deposition.

As an example to demonstrate the method of operation of this automatic feedback control, assume that it is desired to deposit a magnetic film consisting of 75% nickel, 21% iron, and 4% cobalt at a total deposition rate of 8 angstroms per second to a total thickness of 1500 angstroms. This deposition would be carried out in the following manner.

Potentiometer 104 is set to the desired total deposition rate, 8 angstroms per second. Potentiometer 112 and potentiometer 120 are set to the desired amounts of iron and cobalt in the vapor, 21% and iron 4% cobalt. These pontiometers produce output signals to their respective differential amplifiers 106, 114, and 122, which are then utilized to energize temperature controls 108, 116, and 124, thus beginning evaporation of nickel, iron, and cobalt from sources 110, 118, and 126. At this time, the shutter 136 remains closed.

Absorption of light in the selected wavelengths from sample beam 19 by vapor 16 gives output signals for controlling the attenuation of reference beam 43 through positioning of the wavelength filters 68, 70, and 72. The position of these filters in turn provides output signals from potentiometers 81, 83, and 85 which are amplified by non-linear amplifiers 26 and then compared with the output signals from potentiometers 104, 112, and 120. When the two signals so obtained in each case are equal, the desired deposition rate and composition has been attained.

At this time the shutter 136 may be opened, thus allowing deposition on substrate 14 to begin. A signal from shutter control 134 activates integrator 28 and the measurement of thickness deposited begins. Potentiometer 128 has been set to the desired thickness of 1500 angstroms. As long as the actual thickness is below this level, a difference signal between the signal from potentiometer 128 and the signal from integrator 28 produces current through the diode 132, thus keeping shutter 136 in the open position. When the thickness of 1500 angstroms has been attained, the difference signal fed to diode 132 changes sign, and no current flows therefrom to shutter control 134, and shutter control 134 then closes shutter 136 to stop deposition. At this point, another substrate 14 may be moved into deposition position, the integrator 28 may be reset, and deposition may begin on the second substrate.

Experimentally, it has been determined that atomic absorption apparatus of the type herein described will give reliable measurements of rate, thickness, and composition in the deposition of magnetic films at deposition rates of as low as about 0.1 angstrom per second with immediate response. Similar results are obtained with other metals, such as aluminum, gold, copper, and chromium; non-metals, such as silicon and germanium; compounds, such as silicon monoxide; and the like.

In summary, there has been shown and described an apparatus and method suitable for measuring deposition rates, thicknesses, and compositions, either individually or simultaneously in the deposition of magnetic films. The disclosed technique relies purely on radiant energy, it is suitable for even the lowest deposition rates currently employed, it does not interfere with the vapor stream, and the vapor stream does not alter the measuring apparatus itself. Since the apparatus and method disclosed is capable of measuring deposition parameters while deposition is taking place with improved response and reliability, it can be used for automatic process control of deposition. It should now be apparent that an apparatus and method capable of carrying out the stated objects of the invention has been provided.

While the invention has been particularly shown and described with reference to preferred embodiments thereof, it will be understood by those skilled in the art that various changes in form and details may be made therein without departing from the spirit and scope of the invention.

What is claimed is:
1. A vacuum deposition system comprising:
 (A) a vacuum chamber,
 (B) means for supporting a substrate disposed within said vacuum chamber,
 (C) means for depositing vapor from a vapor stream on said substrate for forming a film thereon, and
 (D) means for measuring the thickness of said film including:

(1) a source of radiant energy having a selected wavelength which is absorbable by said vapor stream, positioned to direct said radiant energy through said vapor stream between said means for depositing vapor and said substrate, (2) means for determining the total amount of radiant energy absorbed at the selected wavelength by said vapor stream, and (3) means for converting said amount of radiant energy absorbed to a thickness measurement of said film.

2. The apparatus of claim 1 wherein source of radiant energy is a source of light in the ultraviolet through infrared wavelengths.

3. The apparatus of claim 1 additionally comprising:
(D) means for comparing the actual thickness of material deposited with a predetermined desired thickness, and
(E) means for stopping the deposition when the predetermined thickness has been deposited.

4. An apparatus for depositing material on a substrate in a vapor deposition process at a predetermined rate to a predetermined thickness, comprising:
(A) a vacuum chamber,
(B) a source of vapor to be deposited, located in said vacuum chamber,
(C) means in said vacuum chamber for supporting a substrate on which the material is to be deposited,
(D) a source of radiant energy having a selected wavelength which is absorbed by the vapor, directed at the vapor as it passes from said source to a substrate positioned in said means for supporting a substrate,
(E) means for measuring the total amount of radiant energy so absorbed at the selected wavelength and for generating a first output signal corresponding thereto indicating deposition rate,
(F) means for generating a second output signal corresponding to a predetermined desired rate,
(G) means for comparing the first and second output signals,
(H) means, responsive to the means for comparing the first and second output signals, for adjusting the vapor deposition rate by changing the temperature of the vapor deposition source,
(I) means, responsive to the means for comparing the first and second output signals, for starting deposition of material on the substrate where the signals are equal,
(J) means for integrating the first output signal after deposition on the substrate begins to give a third output signal corresponding to the thickness of material deposited,
(K) means for generating a fourth output signal corresponding to a predetermined desired thickness,
(L) means for comparing the third and fourth output signals, and
(M) means, responsive to the means for comparing the third and fourth output signals, for stopping deposition of material on the substrate when the signals are equal.

5. A system for the vacuum deposition of an alloy on a substrate comprising:
(A) a vacuum chamber,
(B) means for supporting a substrate on which deposition is to take place in said chamber,
(C) an alloy vapor source in said chamber, positioned to direct the alloy vapor at the substrate, and
(D) an apparatus for measuring the composition and amount of the alloy vapor passing between said vapor source and the substrate, comprising:
(1) means for directing through the alloy vapor light having different wavelengths each of which is absorbed by only one of the constituents sought to be measured in the alloy vapor,
(2) means for measuring the total amount of light absorbed arranged to be irradiated by the light remaining in at least one different wavelength for each constituent sought to be measured after passing through the alloy vapor,
(3) means for comparing the amount of light in the different wavelengths detected by said means for measuring with the amount of light in the different wavelengths supplied by said means for directing light,
(4) means for converting the comparison of light detected with light supplied to a measurement of the alloy composition passing between said means for directing light and said means for measuring the total amount of light absorbed, and
(5) means for converting the comparison of light detected with light supplied to a measurement of the amount of alloy passing between the vapor source and substrate.

6. The apparatus of claim 5 wherein the means directing light supplies light in the ultraviolet wavelengths.

7. The apparatus of claim 6 additionally comprising:
(E) means for comparing the measurement of the actual composition of the alloy vapor stream with a predetermined desired composition,
(F) means, responsive to the means for comparing the actual composition with the desired composition of the alloy vapor, for starting deposition when the actual and desired composition are equal,
(G) means for comparing the measurement of the actual amount of the alloy vapor passing from said vapor source toward the substrate with a predetermined desired amount,
(H) means, responsive to the means for comparing the actual and desired amounts, for starting deposition on the substrate when the actual and desired amounts are equal, and
(I) means responsive to the means for comparing the alloy vapor composition and the means for comparing the amount of alloy vapor passing between the source toward the substrate with the predetermined desired composition and amount, for adjusting the alloy vapor composition and amount by changing the temperature of the deposition source.

8. A system for the vacuum deposition of a nickel-iron magnetic film comprising:
(A) a vacuum chamber,
(B) means for supporting a substrate on which the nickel-iron film is to be deposited,
(C) a nickel-iron vapor source positioned to direct the vapor at the substrate, and
(D) an apparatus for measuring the composition and thickness of the nickel-iron magnetic film deposited on the substrate, comprising:
(1) a light source having a first selected wavelength which is absorbed by nickel and not by iron, positioned to pass the light through the vapor as it passes from said vapor source to the substrate,
(2) a light source having a second selected wavelength which is absorbed by iron and not by nickel, positioned to pass light through the vapor as it passes from said vapor source to the substrate,
(3) a detector for measuring the total amount of light absorbed at the first selected wavelength by the nickel,
(4) a detector for measuring the total amount of light absorbed at the second selected wavelength by the iron,
(5) means for converting the measurements of light so absorbed to a composition measurement,
(6) means for converting the measurement of light so absorbed to a rate measurement, and (7) means for integrating the rate measurement to give a thickness measurement.

9. The apparatus of claim 8 wherein the light sources generate light in the ultraviolet wavelengths of about 2,000 to about 3,000 angstroms.

10. The apparatus of claim 8 additionally comprising:
(E) means for comparing the measurement of the actual composition of the vapor stream with a predetermined desired composition,
(F) means for comparing the measurement of the actual rate vapor passes the measuring point with a predetermined desired deposition rate,
(G) means, responsive to the means for comparing the actual and desired composition and to the means for comparing the actual and desired rate, for adjusting the vapor composition and rate by changing the temperature of the vapor source,
(H) means, responsive to the means for comparing the measurement of the actual and desired composition and to the means for comparing the actual and desired rate, for starting deposition when the actual and desired composition and rates are equal,
(I) means for comparing the measurement of actual thickness of the nickel-iron film deposited on the substrate with a predetermined desired thickness, and
(J) means, responsive to the means for comparing the actual and desired thickness, for stopping deposition when the actual and desired thickness are equal.

11. A process for measuring the flow of material between a source and a substrate in a vapor deposition process, comprising:
(A) directing a beam of radiant energy having a selected wavelength which is absorable by said material through said material,
(B) determining the total amount of the radiant energy absorbed by said material, and
(C) converting said total amount of radiant energy absorbed into a rate of flow of said material between said source and said substrate.

12. The process of claim 11 wherein the material deposited on the substrate is an alloy and the process also measures the composition of the alloy being deposited, the process additionally comprising:
In step (A), using as the beam of radiant energy, light in the ultraviolet through infrared wavelengths, and providing at least one wavelength absorbed by only one of each constituent to be measured,
In step (B), determining the total amount of light absorbed by each constituent to be measured at each selected wavelength, and
(D) determining, from the measurement of the total amount of light absorbed at each selected wavelength by the vapor, the amount of each element being measured by the selected wavelengths of light in the vapor stream.
In step (C), converting the amount of radiant energy so determined at each selected wavelength to a concentration of each constituent to be measured.

13. A vacuum deposition system comprising:
(A) a vacuum chamber,
(B) means for supporting a substrate disposed within said vacuum chamber,
(C) a source of vapor to pass as a vapor stream between said source and said substrate for deposit on said substrate, and
(D) an atomic absorption deposition rate monitor including:
(1) a source of radiant energy having a selected wavelength which is absorbable by atoms of said vapor stream, positioned to direct the radiant energy through said vapor stream,
(2) means for detecting the amount of radiant energy remaining after passing through the vapor stream, and
(3) means for converting said amount of radiant energy remaining to a rate at which said vapor stream passes between said source of vapor and said substrate.

14. The apparatus of claim 13 wherein said source of vapor is a vacuum evaporation source.

15. The apparatus of claim 13 wherein said source of vapor is a sputtering means.

16. A fluid flow transport system comprising:
(A) means for causing fluid material to flow from a first location to a second location, and
(B) an absorption spectroscopy monitor for measuring the rate said fluid material flows from the first location to the second location including:
(1) a source of radiant energy having a selected wavelength which is absorbable by said fluid material positioned to direct the radiant energy through said fluid material,
(2) a detector positioned to be irradiated by that portion of said radiant energy remaining after passing through said fluid material, and
(3) means for converting the amount of said radiant energy remaining after passing through said fluid material to a measurement of the flow rate of the fluid material.

17. The system of claim 16 wherein said fluid flow system is a vacuum deposition system, said means for causing the material to flow is a vapor deposition source at the first location within a vacuum chamber and the second location, also within the vacuum chamber, has a means for supporting a substrate on which deposition is to take place.

18. The system of claim 17 wherein said vapor deposition source is a vacuum evaporation source.

19. The system of claim 17 wherein said vapor deposition source is a sputtering means.

20. A fluid flow transport and deposition system comprising:
(A) means for causing fluid material to flow from a first location to a substrate at a second location and be deposited on the substrate, and
(B) an absorption spectroscopy monitor for measuring the rate the fluid material flows from the first location to the second location having:
(1) a source of radiant energy including a selected wavelength which is absorbable by the fluid material positioned to direct the radiant energy through the fluid material, and
(2) a detector means positioned to be irradiated by that portion of the radiant energy at the selected wavelength remaining after passing through the fluid material, the amount of the radiant energy remaining after passing through the fluid material providing an indication of the rate the fluid material passes from the first location to the substrate at the second location.

21. The system of claim 20 wherein said source of radiant energy provides at least one additional selected wavelength absorbable by the fluid material, and the detector means is arranged to be irradiated by that portion of the radiant energy remaining at the additional selected wavelength after passing through the fluid material, the amount of radiant energy remaining at the additional selected wavelength indicating the concentration of a constituent material in the fluid material.

22. A process for measuring the flow of a fluid material from a first location to a second location, comprising:
(A) directing through the fluid material as it passes from the first to the second location a beam of radiant energy having a selected wavelength which is absorbable by the fluid material,
(B) detecting the total amount of the radiant energy remaining at the selected wavelength after passing through the flow of fluid material, and
(C) determining from the amount of remaining radiant energy the rate of flow of the material from the first to the second location.

23. The process of claim 22 wherein the fluid flow is the passage of a vapor from a vapor source to a substrate in a vapor deposition process carried out in a vacuum chamber.

24. The process of claim 23 wherein the vapor deposition process is a vacuum evaporation process.

25. The process of claim 22 wherein the fluid material comprises more than one component material and the process also measures the composition of the fluid material, the process additionally comprising:

In step (A), using as the beam of radiant energy, light in the ultraviolet through infrared wavelength, and providing at least one wavelength absorbable by only one component material to be measured, In step (B), detecting the total amount of light remaining at each selected wavelength, and In step (C), determining the concentration of each component material in the flow of fluid material from the amount of remaining radiant energy, as well as the rate of flow of the fluid material.

26. The process of claim 25 in which said fluid material is an alloy vapor passing from a vapor source to a substrate in a vapor deposition process carried out in a vacuum chamber.

References Cited

UNITED STATES PATENTS

| | | | |
|---|---|---|---|
| 2,469,206 | 5/1949 | Rich | 250—43.5 D |
| 2,952,776 | 9/1960 | Schumacher et al. | 250—43.5 D |
| 3,347,701 | 10/1967 | Yamagishi et al. | 118—49.1 X |
| 2,621,298 | 12/1952 | Wild et al. | 356—88 |
| 2,834,247 | 5/1958 | Pickels | 250—218 |
| 2,927,501 | 3/1960 | Busignies et al. | 356—88 X |
| 3,059,611 | 10/1962 | Fury et al. | 118—8 |
| 3,077,858 | 2/1963 | Vlug | 118—49 X |
| 3,122,638 | 2/1964 | Steele et al. | 250—218 X |
| 3,157,535 | 11/1964 | Radke | 118—49.1 X |
| 3,235,480 | 2/1966 | Swartz et al. | 118—49.1 X |
| 3,257,562 | 6/1966 | Erdman et al. | 250—218 X |
| 3,373,278 | 3/1968 | Cilyo | 118—49.5 X |

MORRIS KAPLAN, Primary Examiner

U.S. Cl. X.R.

117—93.3, 107; 118—7, 49.5; 204—192; 219—272; 250—43.5 D

PO-1050
(5/69)

UNITED STATES PATENT OFFICE
CERTIFICATE OF CORRECTION

Patent No. 3,654,109          Dated April 4, 1972

Inventor(s)    Jakob H. Hohl and Karl H. Raacke

It is certified that error appears in the above-identified patent and that said Letters Patent are hereby corrected as shown below:

In the title: before "FLOW" add -- FLUID --.

Column 2, Line 41, delete "therefor" and substitute therefor -- therefore --. Column 4, Line 71, delete "si" and substitute therefor -- is --. Column 7, Line 23, after "an" add a comma (,). Column 8, Line 1, after "21%" delete "and iron" and substitute therefor -- iron and --.

Column 11, Lines 50-54, delete "(D) determining, from the measurement of the total amount of light absorbed at each selected wavelength by the vapor, the amount of each element being measured by the selected wavelengths of light in the vapor stream." Column 13, Line 12, delete "wavelength" and substitute therefor -- wavelengths --.

Signed and sealed this 8th day of May 1973.

(SEAL)
Attest:

EDWARD M.FLETCHER,JR.          ROBERT GOTTSCHALK
Attesting Officer                Commissioner of Patents